United States Patent [19]
Seidel et al.

[11] Patent Number: 5,474,505
[45] Date of Patent: Dec. 12, 1995

[54] METHOD FOR CONTROLLING AN AUTOMATICALLY OPERATED MOTOR VEHICLE TRANSMISSION

[75] Inventors: Willi Seidel, Eberdingen-Hochdorf; Joseph Petersmann, Wimsheim, both of Germany

[73] Assignee: Dr. Ing. h.c.F. Porsche AG, Germany

[21] Appl. No.: 167,905

[22] PCT Filed: Jun. 19, 1992

[86] PCT No.: PCT/EP92/01386

§ 371 Date: May 9, 1994

§ 102(e) Date: May 9, 1994

[87] PCT Pub. No.: WO93/00535

PCT Pub. Date: Jan. 7, 1993

[30] Foreign Application Priority Data

Jun. 21, 1991 [DE] Germany ............... 41 20 552.9
Jun. 21, 1991 [DE] Germany ............... 41 20 566.9

[51] Int. Cl.[6] ................................................. F16H 61/16
[52] U.S. Cl. ...................... 477/49; 477/43; 477/47
[58] Field of Search ................................ 477/43, 47, 49

[56] References Cited

U.S. PATENT DOCUMENTS

| | | | |
|---|---|---|---|
| 4,589,302 | 5/1986 | Oda et al. | 477/47 |
| 4,680,990 | 7/1987 | Ohgami | 477/47 |
| 4,872,115 | 10/1989 | Itoh et al. | 364/424.1 |
| 4,893,526 | 1/1990 | Tokoro | 477/47 |
| 4,976,170 | 12/1990 | Hayashi et al. | 477/47 |
| 5,007,147 | 4/1991 | Imai et al. | 477/49 |
| 5,050,455 | 9/1991 | Yamashita et al. | 477/47 |
| 5,097,725 | 3/1992 | Sawa | 477/129 |

FOREIGN PATENT DOCUMENTS

| | | |
|---|---|---|
| 0142044 | 5/1985 | European Pat. Off. |
| 3922040 | 7/1989 | Germany . |

*Primary Examiner*—Dirk Wright
*Attorney, Agent, or Firm*—Evenson, McKeown, Edwards & Lenahan

[57] ABSTRACT

A method for controlling an automatically actuated transmission for a motor vehicle, for improving behavior before curves and during braking, provides that a coasting function to suppress a shift or gear ratio changing process is initiated as soon as the accelerator pedal is quickly released. This coasting function is maintained until powered operation is again detected and the vehicle accelerates. Then a holding time is started during which the coasting function is started again as soon as the vehicle changes to coasting operation.

The method is applicable to multi-step transmissions as well as continuously variable transmissions.

13 Claims, 6 Drawing Sheets

METHOD FOR CONTROLLING AN AUTOMATICALLY OPERATED MOTOR VEHICLE TRANSMISSION

CROSS-REFERENCE TO RELATED APPLICATION

This application is related to application Ser. No. 08/170,184 filed on Dec. 21, 1993 in the name of Joseph PETERSMANN et al. for METHOD OF CONTROLLING A CONTINUOUSLY VARIABLE TRANSMISSION, now pending.

The invention relates to a method according to the species of the main claim.

In conventional automatic transmission controls of motor vehicles powered by internal combustion engines, when the accelerator pedal is released, because of the reduced load signal (throttle aperture angle) at approximately the same driving speed, as a rule initiate a reduction of the gear ratio or an upshift. This is not always desirable, however, when rounding curves or when braking, since load changes of this kind under certain conditions may lead to unsafe driving states, or when the motor vehicle is being accelerated again by pressing harder on the accelerator and an increase in the gear ratio or a downshift must be forced. This effect is independent of the transmission design and occurs in both multi-step transmissions and in continuously variable transmissions.

In DE 33 41 652 C2, in the latter and in connection with automatically shifted multi-step transmissions, it is proposed to prevent this reduction of the gear ratio (upshifts) on curves by detecting the transverse acceleration of the motor vehicle. However, this can only be used to avoid shifting on curves.

EP 00 93 312 A1 teaches a method and a device for adjusting the gear ratio of a continuously variable transmission in which, to increase the engine braking effect, it is proposed to keep the gear ratio constant for a certain period of time when the accelerator is released rapidly. If a minimum speed is undershot before this time elapses, or the brake is actuated, or the throttle reaches its neutral position, maintenance of the constant state is interrupted.

In order to be able to prevent a reduction of the gear ratio even when approaching curves, in the method for controlling an automatically shifting transmission according to DE 39 22 040 A1 the rate of change in the accelerator pedal is detected and, when a certain (negative) boundary value is undershot, the signal to suppress an upshift process is derived as soon as coasting is detected. Then upshifts are suppressed until power is applied again and a fixed time interval has elapsed.

It is also provided in DE 39 22 051 A1 to make this time interval dependent upon another parameter (driving activity), which is derived from one or from a combination of several operating and/or driving parameter(s) of a motor vehicle and evaluates a driving style of a driver or a traffic situation prevailing at the moment.

On the basis of this prior art, it is the goal of the invention to provide a method for controlling an automatically operated transmission for a motor vehicle, which in particular is improved further as regards behavior ahead of curves and during braking and which can be used both for multi-step transmissions and for continuously variable transmissions.

The goal is achieved according to the invention by the characterizing features of claim 1. Additional features that characterize the invention are contained in the subclaims.

The advantages of the invention lie primarily in the fact that a method for controlling an automatically actuated continuously variable transmission for a motor vehicle is provided in which the adjustment behavior ahead of curves and during braking is further improved and which is usable both for multi-step transmissions and for continuously variable transmissions. A coast function to suppress a shifting or gear ratio changing process is initiated as soon as the accelerator pedal is released rapidly. This coast function is maintained until the application of power is detected once more and the vehicle accelerates. Then a holding time is started during which the coast function is started again as soon as the vehicle begins coasting.

During coasting, the gear ratio set when the function was initiated is maintained and the gear that was engaged when the function was initiated is maintained. In the case of a continuously variable gear ratio, it is possible to provide, as an alternative, for the shift to take place at a relatively low speed or to be set so that the engine rpm changes at a low speed.

After the holding time has expired, in a continuously variable transmission the shift is adjusted by means of a transition function to the set point determined by shift curves from the currently prevailing operating conditions, in order to avoid abrupt changes. The transition function for example can be a filter with a degressive, linear, or progressive nature or a first or second order delay element, and that time behavior can be freely adjustable. If coasting is again detected during the transition function, the coast function is started again. In multi-step transmissions, after the holding time has expired, a shift by one gear in the direction of a set gear predetermined by a shift diagram is permitted and the holding time started again. This is repeated until the set gear is reached.

This ensures that brief acceleration does not result in suspension of the constantly maintained state or in a slow change in the gear ratio. This can occur for example when the driver has falsely estimated the engine braking torque that develops when he releases the accelerator pedal quickly, and tries to compensate for this.

This coast function can also be initiated with a downshift function which, when noncritical conditions prevail during braking, initiates a downshift or an increase in the gear ratio. If these noncritical conditions are no longer all met, the coast function according to the invention is called up.

Maintenance of noncritical conditions thereby ensures safe operation of the motor vehicle. Thus monitoring is performed to ensure in particular that the transverse acceleration is not too high, the vehicle is not being decelerated too sharply, and the driving speed is not too high, in order to avoid loss as a result of the longitudinal and lateral guiding forces on the wheels of the motor vehicle. The braking torque of the driving (internal combustion) engine which acts on the drive wheels following an increase in the gear ratio or a downshift can therefore not have a negative effect on the driving behavior of the motor vehicle.

Increasing the gear ratio or downshifting when braking firstly increases the braking effect of the engine of the motor vehicle during coasting, so that the brake (service brake) of the motor vehicle has the load on it reduced. On the other hand, in conjunction with maintenance of or a slow change in the gear ratio ahead of, in, and beyond curves, it is ensured that the driver always has available to him, after rounding a curve, the optimum gear ratio and engine rpm for re-accelerating the motor vehicle.

To avoid vehicle instability caused by excessive slip at the drive axle, the coast function is disconnected or interrupted when slip appears, by a slip monitoring function which instead increases the gear ratio or initiates a stepwise upshift until the slip is in the permissible range. When a holding time thus started has expired and the vehicle is accelerating, the slip monitoring function ends.

The invention will be described below with reference to the embodiments shown in the drawings.

Figure 1:
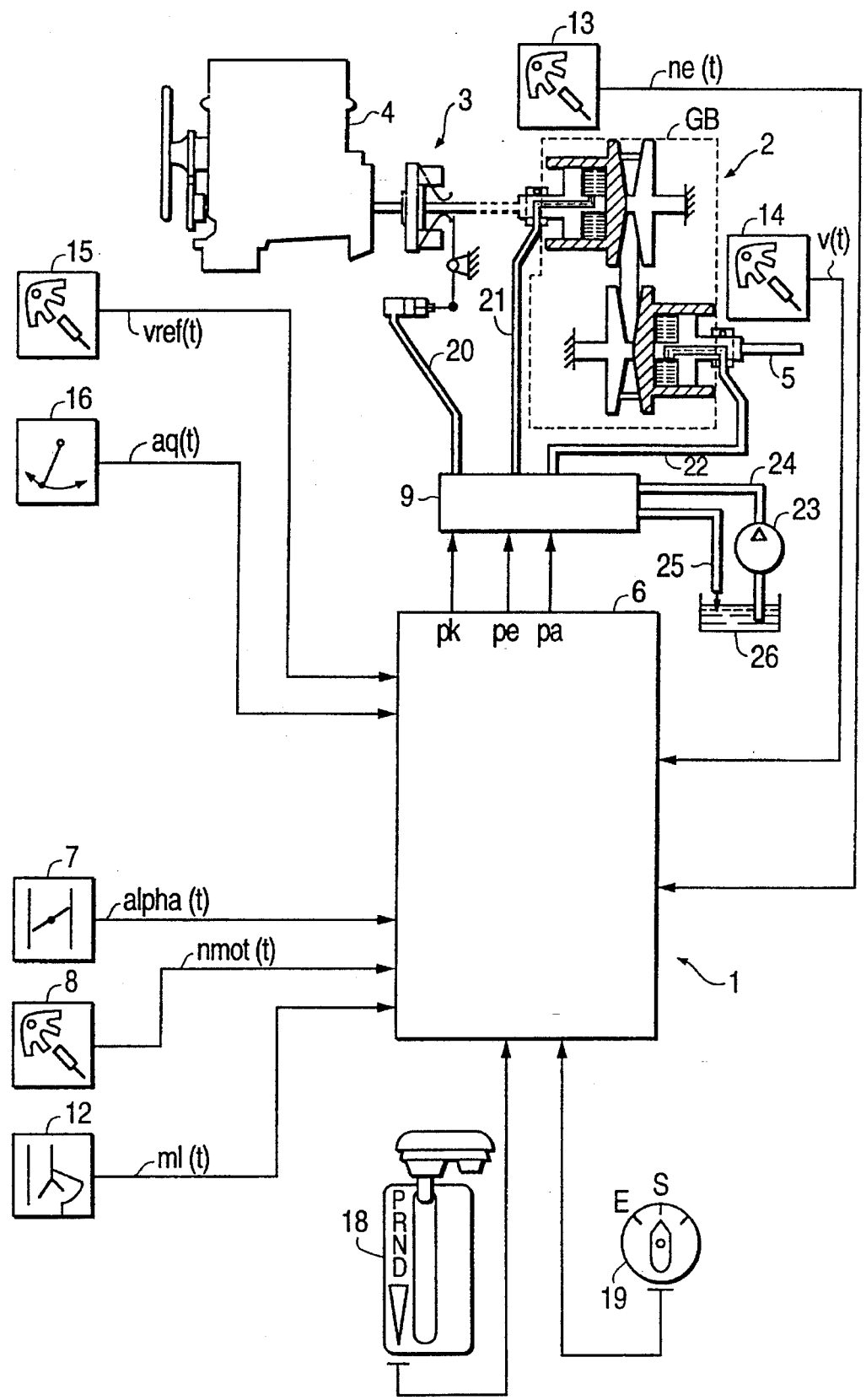
FIG. 1 is a block diagram of an electrohydraulic control for a continuously variable transmission of a motor vehicle.

In FIG. 1, 1 represents a control for an electrohydraulically actuated continuously variable transmission 2 using the example of a friction transmission. Continuously variable transmission 2 is driven through a controllable engaging clutch 3 by an internal combustion engine 4. A drive shaft 5 of continuously variable transmission 2 is connected with a wheel drive, not shown, of a motor vehicle.

In the following, the signals that change with time t are shown as functions f(t) of time.

A control device 6 controls a hydraulic valve body 9 at least as a function of the (without limiting the general nature) throttle position alpha(t) of a throttle sensor 7 and the actual value of an engine rpm nmot(t) of an engine rpm sensor 8 of internal combustion engine 4. Of course, instead of the position of the throttle, the position of any element that influences the driving power of a driving engine of a motor vehicle, for example an accelerator pedal or an injection pump lever of an autoignition diesel engine or the output signal from an electrical or electronic accelerator pedal, can be detected and processed.

To control continuously adjustable transmission 2 and engaging clutch 3, control device 6 receives as additional input values or measured values, the air volume or air mass ml(t), supplied to the internal combustion engine, from an air-volume or air-mass sensor 12 as well as the transmission input rpm ne(t) of a transmission input rpm sensor 13 and a driving speed v(t) of a driving speed sensor 14 of the motor vehicle. In addition, a speed vref(t) of a reference speed sensor 15 on a non-driven vehicle axle and a transverse acceleration aq(t) of a transverse acceleration sensor 16 are detected and processed by control device 6.

Finally the control is usually controllable by the vehicle driver by a selector lever 18 to preselect gears: P (park), R (reverse), N (neutral), and D (automatic adjustment of the gear ratio ue of the continuously variable transmission); in addition, an adjustment range of selector 18 is provided for directly selecting the gear ratio ue.

In ordinary transmission controls, the control curve according to which control device 1 in position D controls the continuously variable transmission, is selected. As a rule, two control curves can be selected whereby in the E position a control curve RKL1 optimized for economy, and in position S a control curve RKL5 optimized for performance, can be set manually.

Alternatively to program selector 19, a control method can advantageously be implemented in control device 6, which, for example according to DE 33 48 652 C2 or DE 39 22 051 A1, evaluates the driving style of a driver or his behavior as a function of traffic situations relative to the control of the motor vehicle and derives a driving activity SK(t) (accelerator pedal activity) from one or more operating or driving parameters. On the basis of this driving activity SK(t), depending on the shift position of program selector 19, one of several of control curves RKLj=f(SK(t)); (j=1, 2, ..., 5), referred to hereinafter as RKL(SK), is then used to control the continuously variable transmission or engaging clutch 3.

Depending on the values mentioned above, control device 6, through a signal output pk and valve body 9, controls the hydraulic pressure in engaging clutch 3 and, through signal outputs pe and pa and hydraulic valve body 9, controls the gear ratio. The gear ratio ue(t) here is proportional to the quotient of the transmission input rpm ne(t) and the driving speed v(t): ue(t)=prop,(ne(t)/v(t)); here prop is a proportional factor.

Here and in the following, these definitions apply:

an upshift in a multi-step transmission corresponds to a decrease in the gear ratio ue or a reduction of the engine rpm nmot (t) and a downshift in a multi-step transmission corresponds to an increase in the transmission ratio ue or an increase in the engine rpm nmot(t).

Hydraulic valve body 49 connects the corresponding control lines 20, 21, and 22 of engaging clutch 3 and continuously variable transmission 2 with a pressure line 24 connected to a pump 23 or to a return line 25 to a supply tank 26 for hydraulic fluid.

Figure 2:
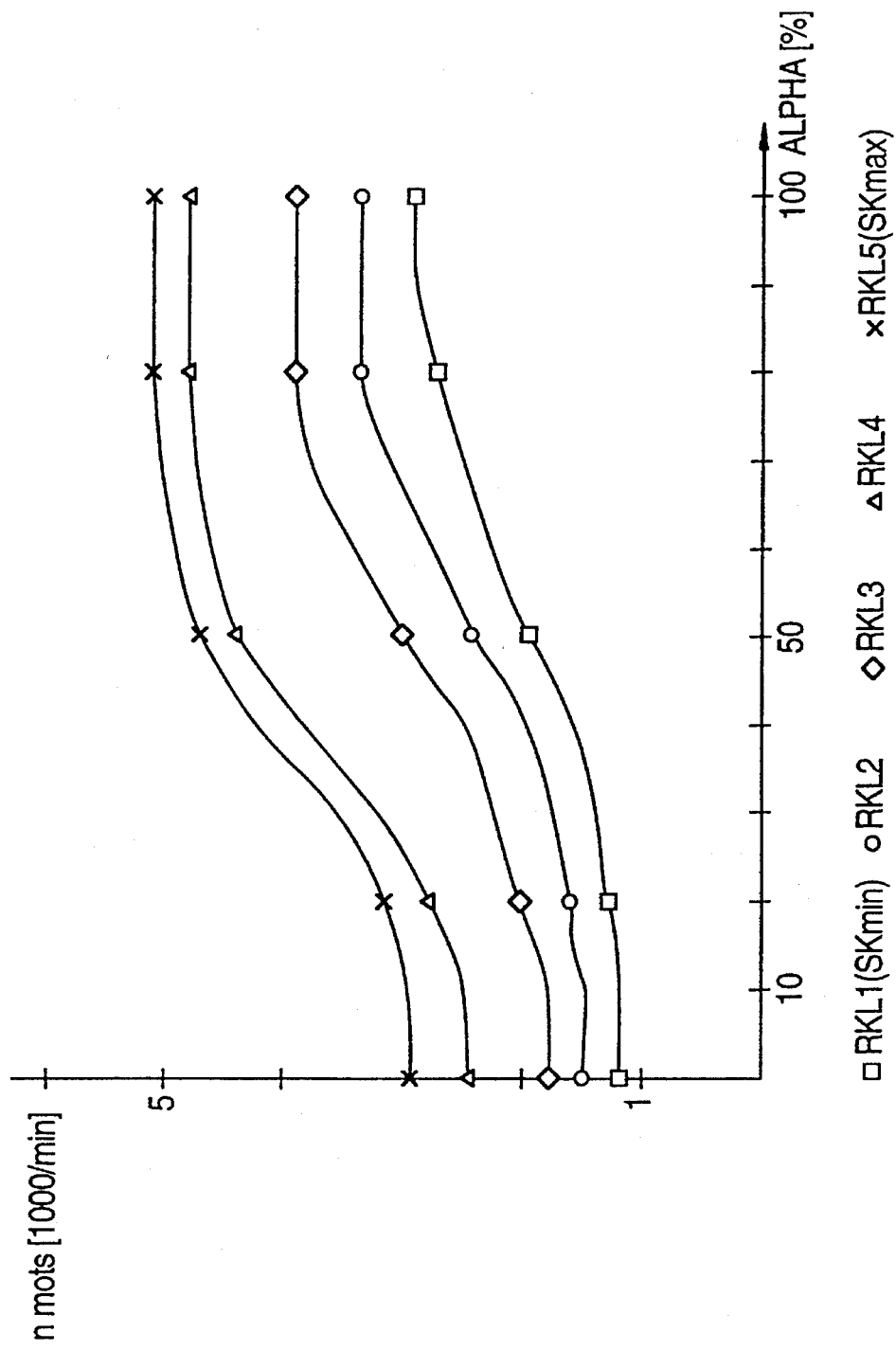
FIG. 2 is a family of several control curves which allocate specific values of engine rpm setpoints to the values of the throttle angle.

To control continuously variable transmission 2, the gear ratio ue of the transmission is set automatically by means of control device 6 and valve body 9 through control curves RKL(SK) at least as a function of the throttle position alpha(t) and the engine rpm n(t); the control curve RKL(SK) is then selected as a function of the switch position of program selector 19 or the driving activity SK(t) of the driver or his behavior as a function of traffic situations relative to the control of the motor vehicle, from a family of several control curves RKL(SK) (j=1, 2, ..., 5) corresponding to FIG. 2.

Without limitation of the general nature, other parameters can also be used to control the continuously variable transmission or the control curves can be expanded to control curve diagrams or characteristic diagrams.

The control curves shown in FIG. 2 cover the area between a control curve RKL1 that permits a type of operation of the motor vehicle which is optimized for consumption (position "E" of the program selector) and a control curve RKL5 with which the motor vehicle can be operated with maximum performance (position "S" on program selector 19), at least in steps.

As soon as the control undertakes the selection of the control curves RKL(SK) as a function of driving activity SK(t), the control of continuously variable transmission 2 automatically adjusts to the driver's driving style so that no manual intervention or adjustment of the control curves need be performed.

The gear ratio ue of continuously variable transmission 2 is preferably adjusted by control device 6 in such a way that the engine rpm nmot(t) is adjusted as optimally as possible to an engine rpm setpoint nmots. For this purpose a subordinate rpm governor can be provided in control device 6. Gear ratio ue is therefore a function of engine rpm setpoint nmots, engine rpm nmot, and time t: ue=f(nmots, nmot, t). A variation Dnmot(t)=nmots(t)-nmot(t) of the engine rpm nmot(t) from engine rpm setpoint nmots(t) is brought toward 0.

The current value of engine rpm setpoint nmots is then determined by means of the control curve RKL(SK) assigned to the momentary driving activity SK(t) according to FIG. 2 from the current value of the throttle position alpha(t): nmots=RKL(SK)(alpha, SK).

As we can see from FIG. 2, control curves RKL(SK) essentially have a progressive pattern in a lower value range of the throttle position alpha, which merges in a central area of the throttle setting alpha into a degressive curve. Throttle position alpha is plotted on the horizontal axis in percent, with the value 0% corresponding to a closed throttle, i.e. the neutral position, and the value 100% corresponding to a fully-opened throttle.

Five control curves are plotted, RKL1, RKL2, RKL3, RKL4, and RKL5, with control curve RKL1 permitting consumption-optimized operation of the motor vehicle and being selected for minimum driving activity SK(t)=SKmin. Control curve RKL5 is selected for maximum driving activity SK(t)=SKmax, at which performance-optimized operation of the motor vehicle is possible.

Corresponding to DE 33 41 652 C2 or DE 29 22 051 A1, driving activity SK(t) is determined by a functional relationship that evaluates the driving style of the driver or his behavior as a function of traffic situations in the long term, from cyclically or anticyclically detected current and past values of a single operating parameter or at a single value assembled from several operating parameters of a motor vehicle.

For this purpose, for example, values of the throttle position alpha(t), driving speed v(t), and transverse acceleration aq(t) in the millisecond range were collected and from them, additional values such as for example the throttle change rate dalpha(t)/dt and the acceleration/deceleration of the vehicle dvt(t)/dt were calculated. The values obtained and calculated were linked by characteristic diagrams with other operating parameters and combined by a functional relationship into an intermediate parameter from which a driving activity SK(t) was obtained by sliding averaging which takes into account both the newly calculated values and the past values over the long term.

By means of another functional relationship, a control curve RKL(SK) is assigned to this driving activity SK(t), for example corresponding to the manner shown in DE 39 22 051 A1.

A rapid coast phase, as shown previously in DE 39 22 040 A1 and DE 39 22 051 A1, can be recognized when the change in throttle position as a function of time dalpha(t)/dt is sensed. As a rule, a driver, for example before entering a curve, lets up on the accelerator, and, as a rule on the throttle as well, more rapidly than he does under normal circumstances in order to adjust the driving speed for example.

This initiates a coast function during which the gear ratio set at the moment of function initiation is maintained.

The coast function ends when the vehicle changes to power application and is accelerated, and a holding time T1 started when these two conditions apply has expired. If coasting operation of the vehicle is recognized within this holding time T1, the coast function is triggered again.

After the coast function has ended, the gear ratio ue is adjusted so that the engine rpm setpoint nmots(t) provided on the momentarily adjusted control curve RKL(SK) at the momentary operating point of the motor vehicle (alpha(t), v(t), nmot(t), t) is reached. If coasting operation of the vehicle is detected during the adjustment, the coast function is triggered again.

To identify the coast phase, the change in throttle position with time is compared with a limiting value which in turn can depend on the driving activity: dalpha(t)dt/<dalpha, grenz (SK). The dependence upon driving activity takes into account the fact that change in the throttle with time, on the average, is greater with performance-optimized driving, corresponding to SK=5, than for consumption-optimized operation, corresponding to SK=0.

To determine whether the vehicle is accelerating, a longitudinal acceleration al(t)=dvref(t)/dt is formed from speed vref(t) and compared to determine whether the latter is greater than 0: al(t)>0 m/s$^2$.

Holding time T1 is largely dependent on driving activity SK(t), but it can also be dependent on the gear ratio set: T1=f(SK(t), ue(t)).

The terms "powered operation" and "coasting operation" refer to the system in question. The following distinctions are made:

Total motor vehicle system: in powered operation the acceleration of the motor vehicle (change in driving speed with time) is dv(t)/dt>0, while coasting operation corresponds to a deceleration of the motor vehicle dv(t)/dt<0.

Clutch/transmission system: in powered operation, the input rpm of the clutch (torque converter)/transmission system is greater than its output rpm, while in coasting operation the input rpm is smaller than the output rpm.

Internal combustion engine system: powered operation means a throttle position alpha(t)>0 and a change in engine rpm with time dnmot(t)/dt>0, while in coasting operation the throttle setting is alpha(t)=0 or the change in engine rpm with time dnmot(t)/dt<0.

Figure 3:
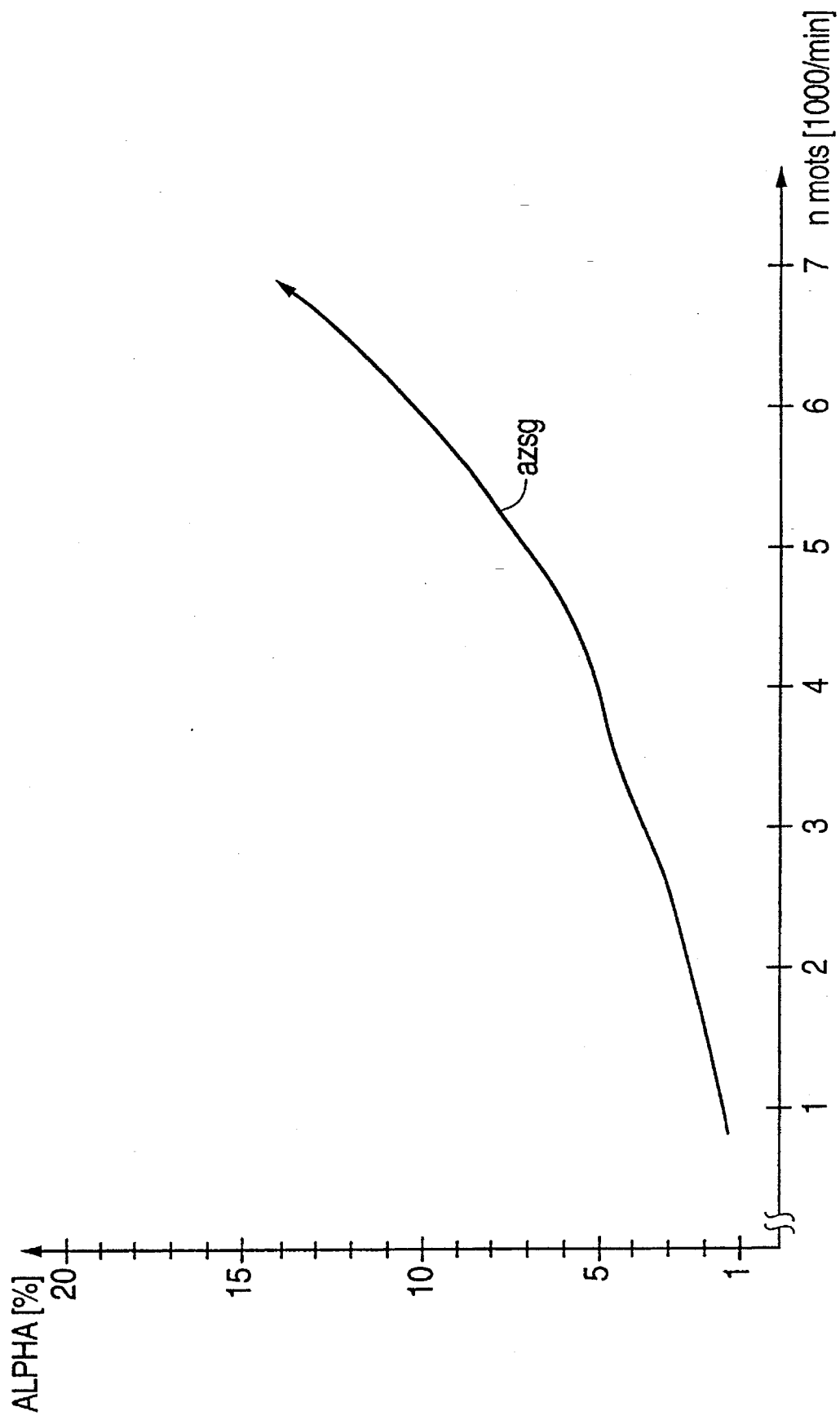
FIG. 3 is a boundary curve for recognition of accelerating/ coasting operation.

In the case of transmission control as well as the overall behavior of the motor vehicle, it has been found to be advantageous to simulate the terms "powered operation" and "coasting operation" as follows:

Coasting operation is recognized when the throttle position alpha(t) drops below an engine rpm-dependent boundary curve azsg(nmot), as shown in FIG. 3: alpha(t)<azsg(nmot).

Powered operation is recognized when the throttle position alpha(t) exceeds the engine rpm-dependent boundary curve azsg(nmot) according to FIG. 3, and the change in driving speed as a function of time dv(t)/dt assumes positive values: (alpha(t)>azsg(nmot) and dv(t)/dt>0).

The adjustment of the engine rpm nmot(t) to the engine rpm setpoint nmots(t) is accomplished by a transition function by which an abrupt change in engine rpm nmot(t) is avoided. The transition function can be a linear, degressive, or progressive filter, but can also take the form of a deceleration element of first or second order. Parameters of the transition function are chosen to be dependent upon driving activity. The transition function ends when the deviation of the engine rpm and nmot(t) from the engine rpm setpoint nmots(t) drops below a preset threshold.

Under certain noncritical conditions, to increase the engine braking effect, it is also provided to increase the gear ratio ue (corresponding to a downshift) by means of a change in the gear ratio that is predicted by a characteristic diagram and depends upon the vehicle deceleration.

For this, the following are both necessary:

a) the vehicle must be in coast operation and b) a transverse acceleration aq(t) detected by transverse acceleration sensor 17 must be below a certain first driving speed-dependent transverse acceleration boundary line aqg1(v(t)): aq(t)<azg1(v(t)), and c) the change in driving speed with time dv(t)/dt must be less than a second negative longitudinal acceleration boundary value albbg(nmot, ue, SK(t), t)=k(ue, SK(t))*albg(ue, nmot, t): dv(t)/dt>albbg(nmot, ue, SK(t), t), and d) the driving speed v(t) must be below a driving speed limiting value vg(ue, SK(t)): v(t)<vg(ue, SK(t)).

If these conditions are no longer met the coast function is activated.

Here are the conditions in detail:

a): The first negative longitudinal acceleration boundary value albg(ue, nmot, t) depends on the momentary values of the gear ratio ue and the engine rpm nmot(t) and here corresponds to the respective (negative) longitudinal acceleration dv/dt (and hence the deceleration) of a motor vehicle rolling on a flat road in a defined state (load, tire pressure, environmental conditions, etc.) with a closed throttle alpha=0, with the respective value pairs of the momentarily set gear ratio ue and engine rpmnmot(t).

Figure 5:
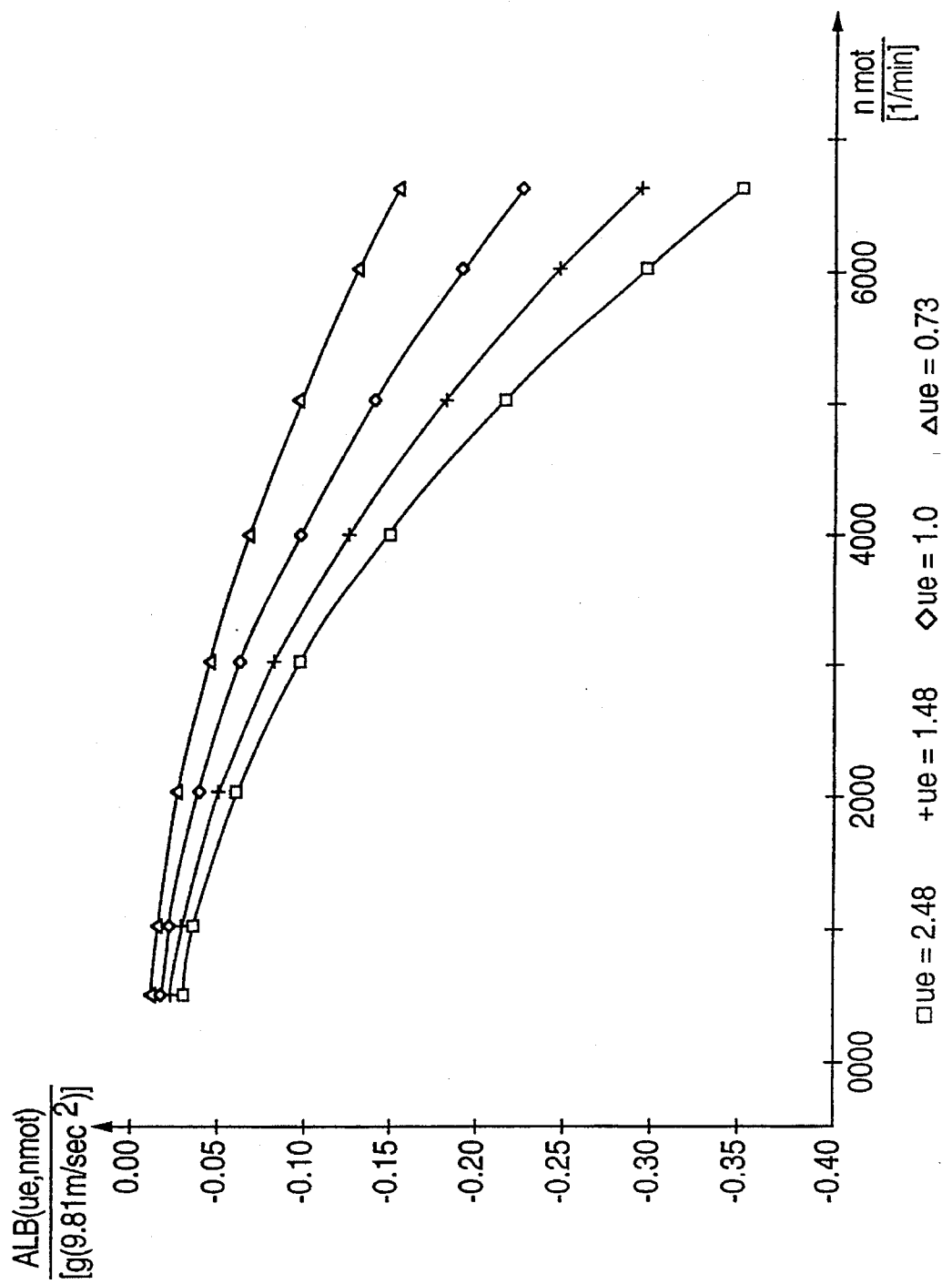
FIG. 5 is a characteristic diagram for a value that is dependent upon engine rpm and gear ratio.

The first negative longitudinal acceleration boundary value albg(ue, nmot, t) is determined from the momentary values of these parameters preferably by means of a first characteristic diagram ALB(ue, nmot): albg(ue, nmot, t)=ALB(ue, nmot). An example of such a first characteristic diagram ALB(ue, nmot) is shown in FIG. 5. Here for example are four gear ratio-dependent curves that represent, for certain characteristic diagram values ALB(ue, nmot) in unit g, the specific values of the engine rpmnmot (in revolutions per minute) corresponding to 9, 81, . . . meters per second (acceleration of gravity).

The values 2.48-1.48-1.0-0.73 are plotted as gear ratios. To determine the characteristic diagram values of the vehicle-specific characteristic diagram that differ from the (gear ratio) curves shown, it is possible either to interpolate or extrapolate as a function of the gear ratio in known fashion. Alternatively of course the longitudinal acceleration boundary values albg(g, nmot, t) can also be determined using a corresponding functional relationship.

Figure 4:
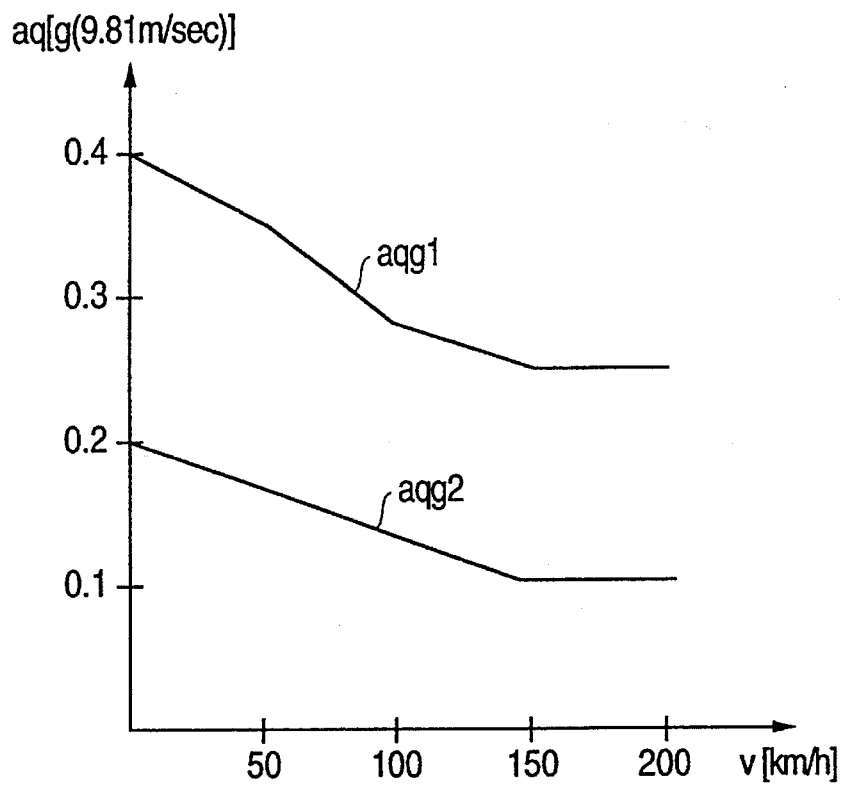
FIG. 4 is a first and a second driving-speed-dependent boundary curve for a transverse acceleration.
Figure 7:
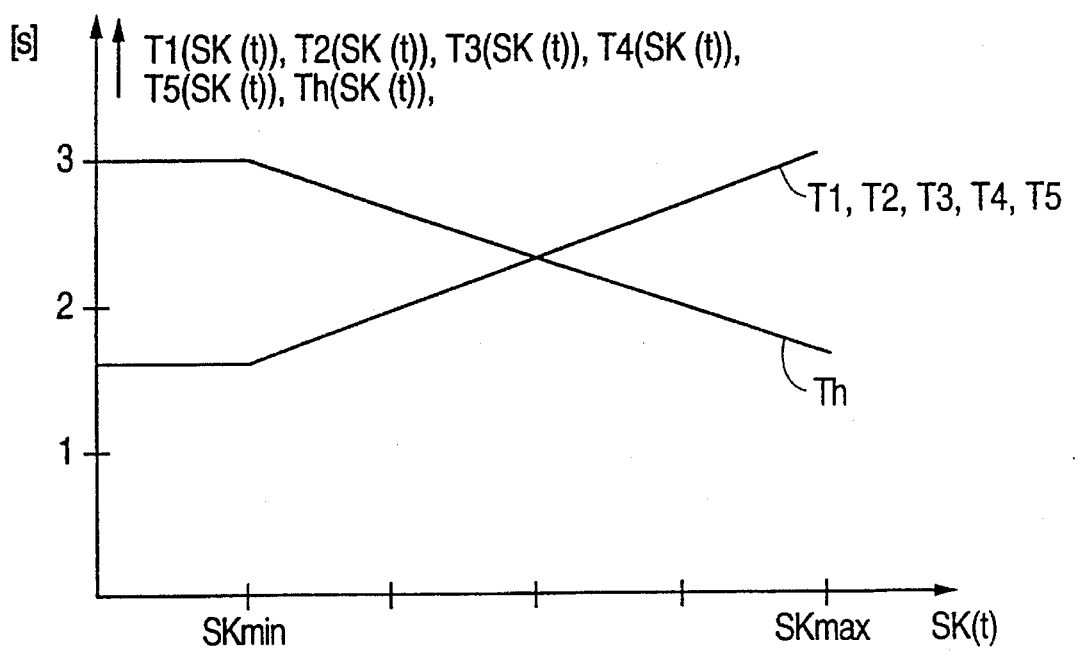
FIG. 7 is a curve showing the dependence of holding times upon a driving activity.

The curves in FIG. 5 clearly show the dependence of the deceleration values of a motor vehicle with an internal combustion engine upon gear ratio ue and engine rpm nmot(t). For increasing values of engine rpm nmot(t) the deceleration values are greater because of the increasing engine braking effect and the increasing rolling resistance and air resistance of the vehicle. Likewise, the deceleration values rise as the gear ratio ue becomes greater, since the braking torque of the internal combustion engine, because of the higher gear ratio, has a greater effect on the deceleration rate of the motor vehicle.

b): The first transverse acceleration boundary line aqg1(v(t)) is preferably driving-speed dependent. A corresponding curve is shown in FIG. 4. It takes into account the fact that the gear ratio ue is only increased when the transverse acceleration of the motor vehicle is not too high.

Checking to determine whether the transverse acceleration aq(t) is below the first specified transverse acceleration boundary line aqg1(v(t)) monitors whether the vehicle is not already in a—relatively tight or rapidly traveled—curve. If such a curve travel is already present, the increase in the gear ratio (corresponding to a downshift) is suppressed, so that the frictional connection between the wheel and the road is not lost because of the braking action that would otherwise increase.

c): The second negative longitudinal acceleration boundary value albbg(nmot, ue, SKt))=k(ue, SK(t))*albg(ue, nmot, t) is determined from a product of a gear-ratio-dependent factor k(ue, SK(t)) and a value for the first longitudinal acceleration boundary value albg(ue, n/not, t) which is determined for the momentary operating conditions of the motor vehicle.

Figure 6:
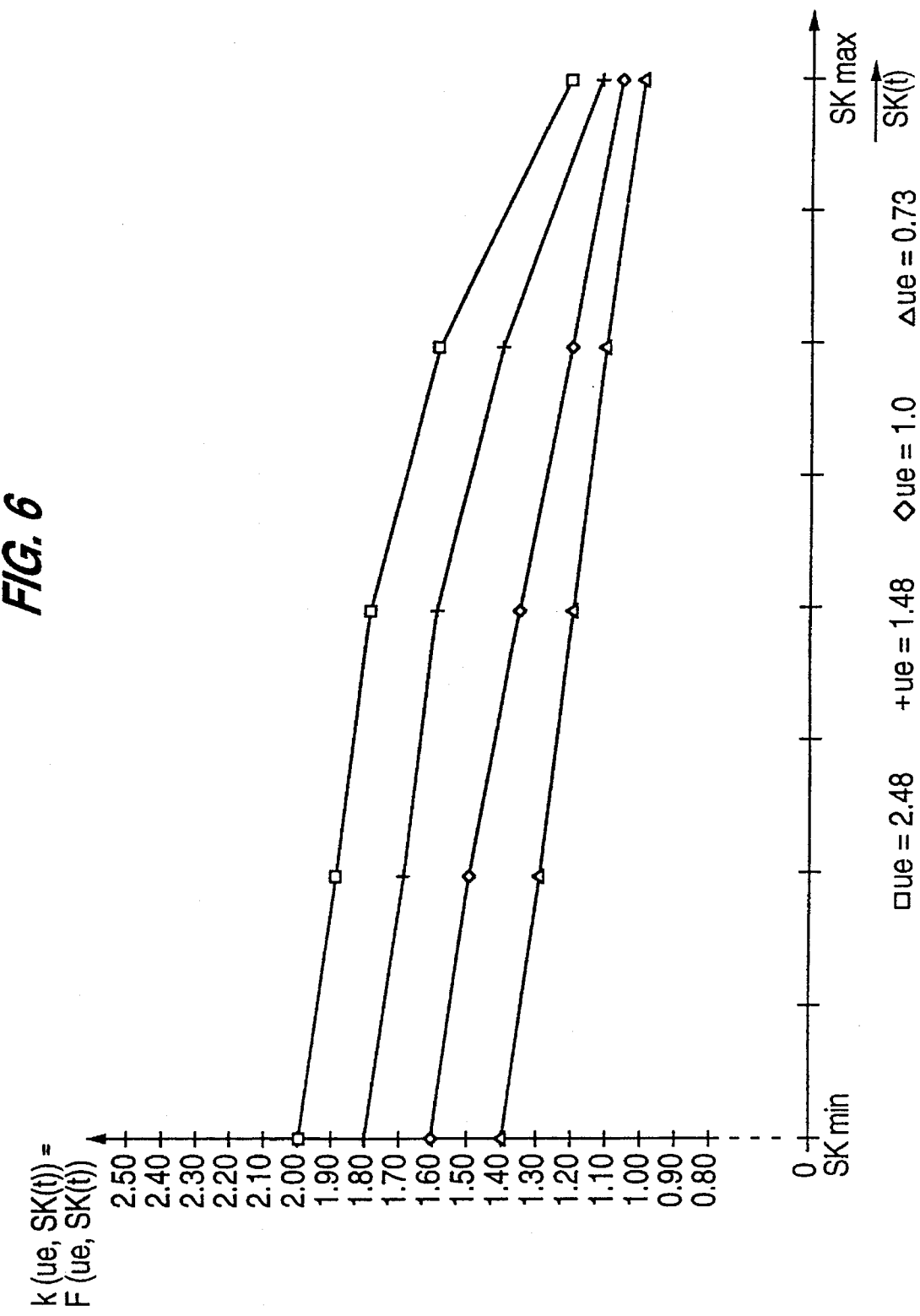
FIG. 6 is a characteristic diagram for a factor that depends upon the gear ratio and driving activity.

The gear-ratio-dependent factor k(ue, SK(t)) is determined with a second characteristic diagram k(ue, SK(t))= F(ue, SK(t)) from the momentary gear ratio ue. An example of the second characteristic diagram will be found in FIG. 6. Here again gear-ratio-dependent curves (gear ratios 2.48-1.48-1.0-0.73) indicate the values of driving activity SK(t), dimensionless values of the factor k(ue, SK(t)); the characteristic diagram values valid for gear ratio values that differ from this can in turn be calculated by interpolation or extrapolation from the available values.

Monitoring the exceeding of the second negative longitudinal acceleration boundary value albbg(nmot, g, SK(t)), i.e. of a second minimum vehicle deceleration, constitutes a safety function; this is a determination of whether the higher deceleration of the motor vehicle that would be expected as a result of the increase in the gear ratio ue (corresponding to a downshift) would lead to exceeding the adhesive friction limit of the wheels.

For this purpose, a momentary maximum permissible deceleration is obtained from the deceleration anticipated at the momentary driving state by weighting (multiplication) with the gear-ratio-dependent factor k(ue, SK(t)) and this is compared with the momentary vehicle deceleration dv(t)/dt; if the momentary deceleration is higher, an increase of the gear ratio (corresponding to a downshift) is suppressed.

The gear-ratio-dependent factor k(ue, SK(t)) takes into account the fact that the second negative longitudinal acceleration (vehicle deceleration) limiting value albbg(ue, nmot, t) is smaller than the first longitudinal acceleration boundary value albg(ue, nmot, t) and is therefore larger in value (corresponding to a higher deceleration rate).

d): The driving speed boundary value vg(ue, SK(t), t) depends on the gear ratio ue and the driving activity SK(t).

With monitoring of the exceeding of the gear-ratio-dependent driving speed boundary value vg(ue, SK(t), t), additional safety criteria regarding an increase in the gear ratio (corresponding to a downshift) at too high a driving speed or the prevention of exceeding rpm limits of the driving internal combustion engine after increasing the gear ratio are met. These safety criteria are highly vehicle specific and must therefore be adjusted individually to each vehicle, so that showing a corresponding characteristic diagram is superfluous.

In order to avoid an undesired change in the gear ratio ue while rounding a curve, after approaching curves or braking before curves, the transverse acceleration of the motor vehicle is monitored. The gear ratio ue is maintained as long as the amount of transverse acceleration |aq(t)| is above a second and lower transverse acceleration boundary line aqg2(v(t)) that depends on the driving speed v(t) as shown in FIG. 4 or as long as a holding time T2(SK(t)) has not yet elapsed after undershooting the transverse acceleration boundary line aqg2(v(t)). If the transverse acceleration boundary line aqg2(v(t)) is exceeded again during holding time T2(SK(t)), the function is restarted. If, after holding time T(SK(t)) has expired, powered operation is detected and the vehicle accelerates, the gear ratio is maintained for an additional time T3(SK(t)). If this is not the case or the holding time T3(SK(t)) has expired, the engine rpm nmot(t) is adapted to the engine rpm setpoint nmots(t) by means of a transition function in the manner described above.

On a higher level, a slip-monitoring function prevents possible instability as a result of excessive slip at the drive axle while the gear ratio is increased in order to reduce the torque acting on the drive axle. This function can interrupt or prevent the functions described earlier.

The slip-monitoring function is triggered when the difference Dv(t) between a speed vref(t) of a non-driven axle and the driving speed v(t) recorded from a driven axle exceeds a first permissible differential speed value Dvzul1(SK)t)): Dv(t)>Dvzul1(SK(t)).

The slip-monitoring function begins adjusting the gear ratio ue in such fashion that a predetermined very small engine rpm and hence a small engine torque are reached. This change in gear ratio is interrupted as soon as the difference Dv(t) corresponding to slip drops below a second differential speed value Dvzul2(SK(t)): Dr(t)<Dvzul2(SK(t)).

If this condition is met, a holding time T4(SK(t)) is started within with the slip-monitoring function is triggered again by recognition of slip.

The slip-monitoring function ends when the vehicle is in powered operation, is being accelerated, and the holding time has elapsed.

In addition, to reduce excessive wheel slip within the slip-monitoring function, the controllable engaging clutch 3 is opened completely or partially.

Likewise, monitoring functions are provided to prevent racing or stalling of the internal combustion engine.

The holding times T1(SK(t)), T2(SK(t)), T3(SK(t)), and T4(SK(t)) are independent of one another, and like the driving speed boundary value vg(ue, Sk(t), t) or the gear-ratio-dependent factor k(ue, SK(t)) can be adjusted at will. Preferably they are adjusted together with an adjustment of the control curves RKL(SK)(consumption-optimized driving program, control curve RKL1; performance-optimized driving program, control curve RKL5) in such manner that for more performance-optimized driving programs (control curve RKL5) the holding times T1(SK(t)), T2(SK(t))), T3(SK(t)), T4(SK(t)) and the boundary value vg(g, SK(t), t) grow larger, and the gear-dependent factor k(g−1, SK(t)) and the permissible differential speed value Dvzul(SK(t)) become smaller.

If on the other hand the transmission control provides for automatic adjustment of the control curves (RKL(SK)) corresponding to the driving activity (SK(t)) that evaluates the driving style of the driver or his behavior as a function of a traffic situation relative to the control of the motor vehicle in the long term, the holding times T1(SK(t)), T2(SK(t)), T3(SK(t)), T4(SK(t), the driving speed limiting value vg(ue, Sk(t), t), the gear-ratio-dependent factor k(ue, SK(t)) or the permissible differential speed value Dvzul-(SK(t)) can also directly depend in part or completely on driving activity SK(t). With an increase in driving activity SK(t) which is more performance-oriented, preferably the holding times T1(SK(t)), T2(SK(t)), T3(SK(t)), T4(Sk(t)), and the boundary value vg(g, SK(t), t) grow larger and the gear-dependent factor k(g−1, SK(t)) and the permissible differential speed value Dvzul (SK(t)) become smaller.

The embodiment shown can be transferred analogously to a multi-step transmission. Instead of the control curves RKL(SK), there are then shift programs and shift diagrams.

Instead of the transition function there is then a shift by one gear at a time followed by a holding time during which the function from which the transition takes place can be restarted.

In the case of a downshift to increase the engine braking effect it is necessary, in addition to the above-mentioned conditions, for the change with time of the driving speed dv(t)/dt to be below the first negative longitudinal acceleration boundary value albg(g, nmot), dv(t)/dt<albg(g, nmot), in other words a minimum vehicle deceleration is reached. From this, the driver's wish is derived after increased deceleration of the vehicle or after an increase in the gear ratio (corresponding to a downshift).

This function produces a downshift by one gear. Then no further downshifts are made for a waiting time T5(SK(t)). After waiting time T5(SK(t)) has expired, the coast function is activated.

The slip-monitoring function is triggered by the same criteria but in addition to opening a converter bridge coupling, produces an upshift by one speed followed by prevention of shifts for a holding time T6(SK(t)). During this holding time T6(SK(t)) the reaction of the vehicle to measures taken is checked; if there is still slip after this time has expired, further upshifts are conducted with a new holding time.

The higher-order monitoring functions are likewise provided for multi-step transmissions.

On the other hand, it is only in continuously variable transmissions that, as an alternative to keeping the gear ratio constant, adjusting the latter with less speed is provided. The shifting process can be regulated or controlled through the gear ratio ue or the engine rpm nmot(t), in other words either the gear ratio ue or the engine rpm nmot(t) is brought back to the value determined by the current operating point according to a desired curve.

We claim:

1. Method for controlling an automatically operated transmission of a motor vehicle, especially one powered by an internal combustion engine, whose internal combustion engine can be influenced by a performance control element, with the gear ratio (ue) or the gear of transmission being adjusted automatically by at least one characterizing curve (RKLj) at least as a function of the throttle position (alpha(t)) and the engine rpm (nmot(t)), wherein the gear ratio (ue) or the gear of the transmission is kept constant when a change with time (dalpha (t)/dr) of the throttle position (alpha (t)) falls below a negative boundary value (−alphaga), and a holding time (Ti(SK(t))) that begins after the vehicle begins to accelerate has not yet expired, whereby in the case that coasting operation is again detected during the expiration of holding time (T1(SK(t)))bm, the gear ratio /ue) is one of kept constant and slowly adjusted until accelerated operation is again detected and the holding time (T1(SK(t))) has again elapsed.

2. Method according to claim 1 characterized by the fact that coasting operation is detected when the throttle position (alpha(t)) drops below a boundary curve (azsg(nmot)) that is dependent on the engine rpm (alpha(t)<azsg(nmot)).

3. Method according to claim 1 characterized by the fact that coasting operation is recognized when the throttle position (alpha(t)) exceeds the engine rpm-dependent boundary curve (alpha(t)>azsg(nmot)) and the change with time in driving speed (dv(t)/dt) assumes positive values (alpha(t)>azsg(nmot) and dv(t)/dt>0.

4. Method according to claim 3 characterized by the fact that after expiration of holding time (T1(SK(t))) adjustment of the engine rpm to the engine rpm setpoint is accomplished by changing the gear ratio (ue) with the aid of a transition function.

5. Method according to claim 4 characterized by the fact that the transition function is a filter with degressive, linear, or progressive character or a delay element of first or second order, whose parameters are freely adjustable.

6. Method for controlling an automatically operated transmission of a motor vehicle, especially one powered by an internal combustion engine, whose internal combustion engine can be influenced by a performance control element, with the gear ratio (ue) or the gear of transmission being adjusted automatically by at least one characterizing curve (RKLj) at least as a function of the throttle position (alpha(t)) and the engine rpm (nmot(t)), wherein when a first condition representative of coasting operation and slight transverse acceleration and sufficient distance from the limit of adhesive friction and sufficient distance from maximum speed is present and in multi-step transmissions a second condition representative of reaching a minimum deceleration in continuously variable transmissions initiates an increase in the gear ratio up to a travel-speed-dependent limiting value and, in multi-step transmissions, a downshift by one gear is initiated, and then, for a waiting time, the gear ratio or gear is determined until a holding time (T1(SK(t))) that begins after acceleration operation begins, has elapsed, whereby in the case where a new coasting operation is detected during expiration of the holding time (T1(SK(t))), the gear ratio continues to be one of kept constant and slowly adjusted until accelerated operation is recognized again and the holding time (T1(SK(t))) has once again elapsed.

7. Method according to claim 6 characterized by the fact that after the waiting time the gear ratio or the gear can be kept constant only when the first condition and in multi-step transmissions the second condition are no longer met.

8. Method according to claim 7 characterized by the fact that the difference (Dv(t)) between a driving speed (vref(t)) and a speed determined on a driven axle (v(t)) is constantly monitored, and when an admissible differential value (Dvzul1(t)) is exceeded, the gear ratio is increased or upshifted by one gear until difference (Dv(t)) drops below a second differential value (Dvzul2(t)).

9. Method according to claim 8 characterized by the fact that simultaneously a positive connection between the engine and the transmission is completely or partially broken.

10. Method according to claim 9 characterized by the change in the gear ratio or the gear is ended when the vehicle is in powered operation and being accelerated.

11. Method according to claim 10 characterized by the fact that at least one of the holding times or one of the boundary values or one of the comparative values or one of the factors is arbitrarily adjustable and preferably can be set together with an adjustment of the characterizing curves (RKLj) (consumption-optimized driving program, control curve RKL1; performance-optimized driving program, control curve RKL5) in such fashion that with the more performance-optimized driving program (control curve RKL5) the holding times and the boundary values increase and the comparison values or factors decrease.

12. Method according to claim 10 characterized by the fact that at least one of the holding times or one of the boundary values or one of the comparison values or one of the factors depend upon the driving activity (SK(t)) evaluating the driving style of the driver or his behavior in traffic situations relative to the control of the motor vehicle in the long term and, with increasing, more performance-oriented driving activity (SK(t)), the holding times and the boundary values increase and the comparison values or the factors decrease.

13. Method according to claim 12 characterized by the driving activity (SK(t)) being determined by a functional relationship (sliding averaging) which evaluates the driving style of the driver or his behavior in traffic situations relative to the control of the motor vehicle on a long-term basis, from current and past values of a single operating parameter or a parameter assembled from several operating parameters of a motor vehicle.

\* \* \* \* \*